United States Patent Office 3,084,167
Patented Apr. 2, 1963

---

3,084,167
ISOINDOLES
Leonard M. Rice, Baltimore, Md., assignor to The Geschickter Fund for Medical Research, Inc., Washington, D.C., a corporation of New York
No Drawing. Filed Dec. 9, 1954, Ser. No. 474,288
9 Claims. (Cl. 260—319)

The present invention relates to organic compounds, particularly new, substituted isoindole derivatives and their quaternary salts with various hydrogenation states and to methods of producing such compounds.

According to the present invention, generally stated, new products which are of outstanding value in the treatment of various diseases are made by preparing N-substituted isoindoles, of varying degrees of hydrogenation of the type represented by the formula

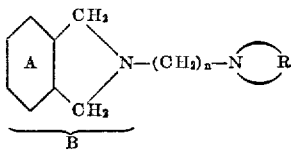

and conversion to their corresponding di-methionium salts, having the formula:

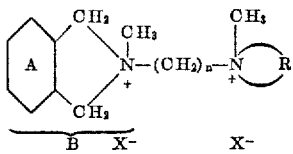

In the above Formulae 1 and 2, the six membered ring A, of the isoindole nucleus, B, represents a cyclic hydrocarbon ring, substituted or unsubstituted and in various stages of hydrogenation, being selected from the following group:

Phenyl
Cyclohexene
Endomethylene-cyclohexene
3-methyl-cyclohexene
5-methyl-cyclohexene
3,5-dimethyl-cyclohexene
Cyclohexane
3-methyl-cyclohexane
5-methyl-cyclohexane
3,5-dimethyl-cyclohexane
Endomethylene-cyclohexane Also, in the general formulae,

represents (1) a dialkylamino group or radical having from 1 to 6 carbon atoms in the alkyl chains or (2) a heterocyclic alkylamino group or ring such as morpholine, pyrrolidine or piperidine; $n$ represents a number from 2 to 6 and $x$ represents a halogen ion such as chloride, bromide or iodide or the methylsulfate ion.

At this juncture, it is pointed out that the naming of these compounds is in conformity with the Patterson Ring Index as illustrated in the following examples in which numbers 8 and 9 had to be assigned to the two carbon atoms at the ring junctions.

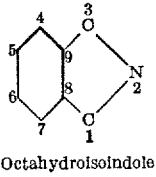

Octahydroisoindole

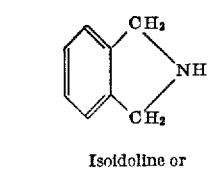

Isoidoline or dihydroisoindoline

The products of the present invention may be prepared by reacting a dialkylaminoalkylamine or heterocyclicalkylamine with a molecular equivalent of the corresponding acid anhydride. The acid anhydrides used in this invention are phthalic; tetrahydrophathalic; endomethylene tetrahydrophthalic; 5 - methyl tetrahydrophthalic; 3,5-dimethyl tetrahydrophthalic; endomethylene hexahydrophthalic; 5-methyl hexahydrophthalic; 3,5-dimethyl hexahydrophthalic; 3-methyl tetrahydrophthalic; and 3-methyl hexahydrophthalic; as well as those derived from hexahydrophthalic, anhydride, dichlorophthalic anhydride, and tetrachlorophthalic anhydride and halogen substituted derivatives such as by chlorine, bromine, and iodine and the hydrogenated derivatives of these phthalic anhydrides.

The resulting N-substituted dialkylaminoalkyl imide is then reduced by suitable means, for example, with lithium aluminum hydride or sodium in alcohol, or catalytically or electrolytically, to the corresponding isoindole derivative which is then methylated to the quaternary salt. The following examples illustrate this synthesizing process of the present invention and exemplary compounds resulting therefrom. These examples are to be construed as merely illustrative and not limiting the scope of the present invention.

EXAMPLE I

*N-Diethylaminoethyl Octahydroisoindole-Dimethyl Quaternary Iodide*

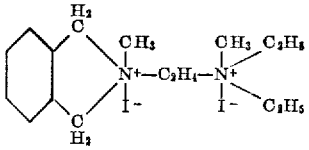

A mixture of 116 grams (1 mole) of diethylaminoethylamine and 154 grams (1 mole) of hexahydrophthalic anhydride was heated in a bath at 160–170° C. for 4 hours. The mixture was allowed to cool and then vacuum distilled. The distillation yielded 220 grams of N-diethylaminoethyl hexahydrophthalimide boiling at 132–135° C. at 2 mm. pressure.

With stirring 110 grams of the N-diethylaminoethyl hexahydrophthalimide was added dropwise to 36 grams of lithium aluminum hydride dissolved in 1000 ml. of anhydrous ether at such a rate as to maintain a gentle reflux of the ether. After all the material was added, the reaction mixture was decomposed with a minimum amount of cold water. This was determined by the liberation of hydrogen and refluxing of the ether. When gas was no longer evolved, the mixture was stirred for 25 hours and then filtered. The ethereal filtrate was concentrated to give the isoindole derivative which, when distilled at a pressure of 2 mm., boiled at 93–96° C. and weighed 85 grams.

The isoindole derivative was dissolved in absolute alcohol and treated with a 10% excess of methyl iodide. The quaternary salt crystallized out of the solution and after recrystallization from alcohol melted at 224–225° C.

EXAMPLE II

*N-Diethylaminoethyl-4,7,8,9-Tetrahydroisoindoline Dimethyl Quaternary Iodide*

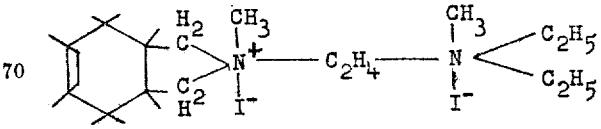

A mixture of 116 grams of diethylaminoethyl amine and 152 grams of cis-Δ⁴-tetrahydrophthalic anhydride was maintained at 160–170° C. for 4 hours. After cooling, the mixture was vacuum distilled whereupon it yielded 210 grams of N-diethylaminoethyl - cis - Δ⁴ - tetrahydrophthalimide boiling at 132–134° C. at 2 mm.

110 grams of the above imide was added, at such a rate as to just maintain reflux, to 36 grams of lithium aluminum hydride dissolved in 1000 ml. of anhydrous ether. When all the material had been added, the reaction mixture was decomposed with a minimum amount of cold water. The solution was filtered and the filstanding. After recrystallization from alcohol the quaternary salt of the isoindoline melted at 218–220° C.

The isoindoline derivative was dissolved in absolute alcohol and treated with a 10% excess of methyl iodide. The quaternary salt precipitated from the solution on standing. After recrystallization from alcohol the quaternary salt of the isoindoline melted at 218–220° C.

EXAMPLE III

*N-Diethylaminoethyl-1-3-Dihydroisoindole Dimethiodide*

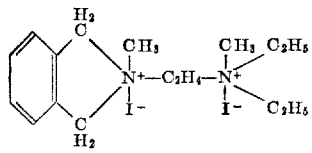

A mixture of 116 grams of diethylaminoethylamine and 148 grams of phthalic anhydride was heated at 160–170° C. for 4 hours. When cool, the mixture was vacuum distilled and yielded 215 grams of N-diethylaminoethyl phthalimide boiling at 140–143° C. at 2 mm.

With stirring, 110 grams of the above imide was added, at such a rate as just to maintain reflux, to 36 grams of lithium aluminum hydride dissolved in 1000 ml. of dry ether. When all the imide was added the reaction mixture was decomposed with a minimum amount of cold water. The solution was filtered and the filtrate was concentrated to give the isoindole which, when distilled at a pressure of 2 mm., boiled at 101–104° C.

The isoindole derivative was dissolved in absolute alcohol and a 10% molar excess of methyl iodide was added. The product which separated after recrystallization from alcohol melted at 193–194° C.

EXAMPLE IV

*N-Diethylaminoethyl-4,7,8,9-Tetrahydro-4,7-Endomethano-Isoindoline Dimethiodide*

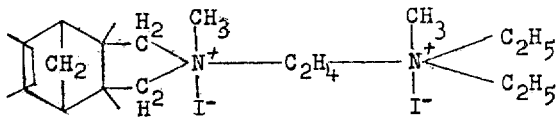

The imide may be prepared by reacting 116 grams of diethylaminoethylamine with 164 grams of 3,6-endomethylene-cis-Δ⁴-tetrahydrophthalic anhydride as in Example I. This imide boils at 142–144° C. at 2 mm. pressure.

Reduction of the imide as in Example I yielded 109 grams of the isoindoline direvative boiling at 122–124° at 2 mm. pressure.

Conversion into the methionium salt as in Example I yielded the quaternary salt melting at 208–210° C.

EXAMPLE V

*N-Dimethylaminoethyl-6-Methyl-4,7,8,9-Tetrahydroisoindoline Dimethiodide*

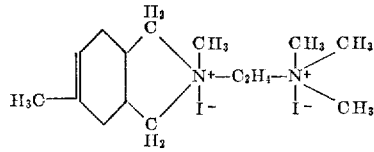

The imide was prepared from 5-methyl cis-Δ⁴-tetrahydrophthalic anhydride as in Example I and boiled at 106–112° C. at 0.2 mm.

Reduction by means of lithium aluminum hydride as in Example I yielded the base boiling at 78–85° C. at 0.1 mm.

Conversion to the quaternary salt as in Example I gave the product which, after recrystallization, melted at 203–205° C.

EXAMPLE VI

*N-Dimethylaminoethyl-4,6-Dimethyl-4,7,8,9-Tetrahydroisoindoline Dimethiodide*

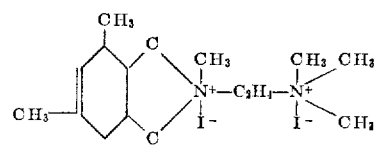

The imide was prepared from 3,5-dimethyl cis-Δ⁴-tetrahydrophthalic anhydride as in Example I and boiled at 101–105° C. at 0.1 mm. The base was obtained by reduction as in Example I and boiled at 87–94° C. at 0.1 mm. Conversion to the dimethiodide as in Example I yielded the salt with a melting point of 194–197° C.

EXAMPLE VII

*N-Dialkylaminoalkyl-4,5,6,7,8,9-Hexahydro-4,7-Endomethano Isoindolines*

A. These isoindolines and their derivatives were prepared in the manner illustrated by the foregoing examples, the starting anhydride being endomethylene hexahydrophthalic anhydride which recently has become commercially available. The imide resulting when this anhydride is reacted with diethylaminoethyl amine is N-diethylaminoethyl - endomethylene - hexahydrophthalimide, which has a boiling point of 130–135° C. at 2 mm. pressure. The hydrochloride salt of this imide has a melting point of 205–206° C. Reduction of the imide gives the corresponding isoindoline having a boiling point of 110°–114° C. at 1 mm. The dimethiodide, obtained by methylation of this isoindoline as hereinbefore described, has a melting point of 213–214° C.

B. With the same anhydride and dimethylaminoethyl amine, the corresponding compounds were obtained and are characterized as follows:

Imide: N - dimethylaminoethyl-endomethylene - hexahydrophthalimide, boiling point, 120–123 at 2 mm.
Imide hydrochloride: Melting point, 201–203° C.
Isoindoline: N-dimethylaminoethyl-4,5,6,7,8,9-hexahydro-4,7-endomethano-isoindoline, boiling point, 103–108° C. at 2 mm.
Isoindoline dimethiodide: Melting point, 220–221° C.

The following tabulation presents further examples of compounds embraced by the invention, which were prepared according to the procedure set forth hereinabove.

| Ex. No. | Imide | Boiling point, °C. | Imide hydrochloride melting point, °C. | Isoindoline | Boiling point, °C. | Isoindoline dimethiodide melting point, °C. |
|---|---|---|---|---|---|---|
| VIII | N-dimethylaminoethyl-5-methyl hexahydrophthalimide. | 104–107 at 0.1 mm | 217–218 | N-dimethylaminoethyl-6 methyl-4,5,6,7,8,9-hexahydroisoinoline. | 72–75 at 0.1 mm | 199–201 |
| IX | N-dimethylamino propyl-3,5-dimethyl hexahydrophthalimide. | 108–113 at 0.1 mm | 193–194 | N-dimethylaminopropyl-4, 6-dimethyl-4, 5, 6, 7, 8, 9-hexahydroisoindoline. | 80–84 at 0.2 mm | 206–207 |
| X | N-dimethylaminoethyl-3-methyl tetrahydrophthalimide. | 108–110 at 0.1 mm | 220–221 | N-dimethylaminoethyl-4, methyl-4, 7, 8, 9-tetrahydroisoindoline. | 74–76 at 0.1 mm | 202–203 |
| XI | N-dimethylaminoethyl-3-methyl hexahydrophthalimide. | 101–105 at 0.1 mm | 218–220 | N-dimethylaminoethyl-4-methyl-4, 5, 6, 7, 8, 9-hexahydroisoindoline. | 70–74 at 0.1 mm | 199–201 |

The following tables show various other modifications prepared according to the present invention.

TABLE I

N-DIAKYLAMINOALKYL-4-TETRAHYDROPHTHALIMIDES

| N-substitution | Formula | B.P., °C. | Mn. | Carbon Calcd. | Carbon Found | Hydrogen Calcd. | Hydrogen Found | Nitrogen Calcd. | Nitrogen Found | HCl M.P., °C. |
|---|---|---|---|---|---|---|---|---|---|---|
| (1) Diethylaminoethyl | $C_{14}H_{22}N_2O_2$ | 132–134 | 2 | 67.17 | 66.92 | 8.86 | 9.01 | 11.19 | 11.03 | 214–215 |
| (2) Dimethylaminopropyl | $C_{13}H_{20}N_2O_2$ | 140–144 | 2 | 66.07 | 66.20 | 8.53 | 8.44 | 11.86 | 11.55 | 172–173 |
| (3) Diethylaminopropyl | $C_{15}H_{24}N_2O_2$ | 162–165 | 3 | 68.15 | 68.34 | 9.15 | 8.98 | 10.60 | 10.27 | 114–116 |
| (4) Morpholinopropyl | $C_{15}H_{22}N_2O_3$ | 175–178 | 2 | 64.72 | 64.93 | 7.97 | 7.62 | 10.07 | 9.81 | 203– |

N-DIALKYLAMINOALKYL-3,6-ENDOMETHYLENE-4-TETRAHYDROPHTHALIMIDES

| N-substitution | Formula | B.P., °C. | Mn. | Carbon Calcd. | Carbon Found | Hydrogen Calcd. | Hydrogen Found | Nitrogen Calcd. | Nitrogen Found | HCl M.P., °C. |
|---|---|---|---|---|---|---|---|---|---|---|
| (1) Diethylaminoethyl | $C_{15}H_{22}N_2O_2$ | 142–144 | 2 | 68.75 | 69.05 | 8.46 | 8.39 | 10.68 | 10.69 | 219–220 |
| (2) Dimethylaminopropyl | $C_{14}H_{20}N_2O_2$ | 139–142 | 2 | 67.71 | 67.91 | 8.06 | 8.12 | 11.28 | 11.00 | 206–207 |
| (3) Morpholinopropyl | $C_{16}H_{22}N_2O_3$ | 190–194 | 2 | 66.21 | 66.10 | 7.58 | 7.21 | 9.64 | 9.86 | 191–193 |

N-DIALKYLAMINOALKYL PHTHALIMIDES

| N-substitution | Formula | B.P., °C. | Mn. | Carbon Calcd. | Carbon Found | Hydrogen Calcd. | Hydrogen Found | Nitrogen Calcd. | Nitrogen Found | HCl M.P., °C. |
|---|---|---|---|---|---|---|---|---|---|---|
| (1) Diethylaminoethyl | $C_{14}H_{18}N_2O_2$ | 140–143 | 2 | 68.27 | 68.35 | 7.37 | 7.52 | 11.37 | 11.28 | 232–233 |
| (2) Dimethylaminopropyl | $C_{13}H_{16}N_2O_2$ | 140–145 | 2 | 67.22 | 67.06 | 6.94 | 6.75 | 12.06 | 11.99 | 206–207 |
| (3) Morpholinopropyl | $C_{15}H_{18}N_2O_3$ | 173–177 | 2 | 65.67 | 65.40 | 6.61 | 6.74 | 10.21 | 10.11 | 247–248 |

N-DIALKYLAMINOALKYL HEXAHYROPHTHALIMIDES

| N-substitution | Formula | B.P., °C. | Mn. | Carbon Calcd. | Carbon Found | Hydrogen Calcd. | Hydrogen Found | Nitrogen Calcd. | Nitrogen Found | HCl M.P., °C. |
|---|---|---|---|---|---|---|---|---|---|---|
| (1) Dimethylaminoethyl | $C_{12}H_{20}N_2O_2$ | 116–119 | 2 | 64.25 | 64.35 | 8.99 | 8.63 | 12.49 | 12.19 | 191–192 |
| (3) Diethylaminoethyl | $C_{14}H_{24}N_2O_2$ | 132–135 | 2 | 66.63 | 66.68 | 9.59 | 9.16 | 11.10 | 10.99 | 196–197 |
| (3) Dimethylaminopropyl | $C_{13}H_{22}N_2O_2$ | 130–132 | 2 | 65.51 | 65.33 | 9.31 | 9.10 | 11.76 | 11.67 | 176–177 |
| (4) Diethylaminopropyl | $C_{15}H_{26}N_2O_2$ | 150–153 | 2 | 67.63 | 67.45 | 9.84 | 9.69 | 10.52 | 10.40 | 123–124 |
| (5) Morpholinoethyl | $C_{14}H_{22}N_2O_3$ | 162–164 | 2 | 63.13 | 63.43 | 8.33 | 8.18 | 10.52 | 10.82 | 235–236 |
| (6) Morpholinopropyl | $C_{15}H_{24}N_2O_3$ | 173–177 | 2 | 64.26 | 64.54 | 8.63 | 8.44 | 9.99 | 10.03 | 162–163 |
| (7) Dibutylaminopropyl | $C_{19}H_{34}N_2O_2$ | 155–160 | 0.1 | 70.76 | 70.57 | 10.63 | 10.65 | 8.69 | 9.07 | 107–109 |
| (8) Dihexylaminoethyl | $C_{22}H_{40}N_2O_2$ | 170–175 | 0.2 | 72.48 | 72.26 | 11.06 | 10.81 | 7.68 | 7.98 | |
| (9) Diethylaminohexyl | $C_{18}H_{32}N_2O_2$ | 158–163 | 0.1 | 70.09 | 69.75 | 10.46 | 10.27 | 9.08 | 8.78 | 113–114 |
| (10) Piperdinoethyl | $C_{15}H_{24}N_2O_2$ | 138–142 | 0.1 | 68.15 | 68.14 | 9.15 | 90.2 | 10.60 | 10.27 | 212–213 |
| (11) Diethylaminobutyl | $C_{16}H_{28}N_2O_2$ | 134–139 | 0.02 | 68.53 | 68.84 | 10.07 | 9.62 | 9.99 | 9.69 | 95–96 |
| (12) 3-diethylaminopropanol-2 | $C_{15}H_{26}N_2O_3$ | 146–148 | 0.1 | 63.80 | 63.66 | 9.28 | 9.40 | 9.92 | 9.98 | 138 |

N-DIALKYLAMINOALKYL-5-METHYL-4-TETRAHYDROPHTHALIMIDES

| N-substitution | Formula | B.P., °C. | Mn. | Carbon Calcd. | Carbon Found | Hydrogen Calcd. | Hydrogen Found | Nitrogen Calcd. | Nitrogen Found | HCl M.P., °C. |
|---|---|---|---|---|---|---|---|---|---|---|
| Dimethylaminoethyl | $C_{13}H_{20}N_2O_2$ | 106–112 | 0.2 | 66.07 | 66.13 | 8.53 | 8.42 | 11.86 | 12.10 | 228–229 |

TABLE II

N-DIALKYLAMINOALKYL-4,7,8,9-TETRAHYDROISOINDOLINES

| R | Formula | B.P., °C. | Mn. | Carbon Calcd. | Carbon Found | Hydrogen Calcd. | Hydrogen Found | Nitrogen Calcd. | Nitrogen Found | HCl M.P., °C. | Dimethiodide M.P., °C. | Dimethiodide Nitrogen Calcd. | Dimethiodide Nitrogen Found |
|---|---|---|---|---|---|---|---|---|---|---|---|---|---|
| Diethylaminoethyl | $C_{14}H_{26}N_2$ | 96–98 | 2 | 75.55 | 75.29 | 11.78 | 11.42 | 12.58 | 12.43 | 161–163 | 219–221 | 5.53 | 5.18 |
| Dimethylaminopropyl | $C_{13}H_{24}N_2$ | 88–92 | 2 | 74.94 | 74.74 | 11.61 | 11.37 | 13.45 | 13.34 | 220–222 | 234–235 | 5.69 | 5.56 |
| Diethylaminopropyl | $C_{15}H_{28}N_2$ | 106–108 | 2 | 76.21 | 76.17 | 11.94 | 11.69 | 11.85 | 11.70 | 137–138 | 228–229 | 5.60 | 5.50 |
| Morpholinopropyl | $C_{15}H_{26}N_2O$ | 126–130 | 2 | 71.95 | 72.38 | 10.46 | 10.52 | 11.19 | 11.45 | 216–217 | 216–217 | 5.24 | 5.60 |

N-DIALKYLAMINOALKYL-4,7,8,9-TETRAHYDRO-4,7-ENDOMETHANOISOINDOLINES

| R | Formula | B.P., °C. | Mn. | Carbon Calcd. | Carbon Found | Hydrogen Calcd. | Hydrogen Found | Nitrogen Calcd. | Nitrogen Found | HCl M.P., °C. | Dimethiodide M.P., °C. | Dimethiodide Nitrogen Calcd. | Dimethiodide Nitrogen Found |
|---|---|---|---|---|---|---|---|---|---|---|---|---|---|
| Diethylaminoethyl | $C_{15}H_{26}N_2$ | 122–124 | 2 | 76.91 | 77.19 | 11.17 | 10.99 | 11.94 | 11.95 | 175–176 | 208–210 | 5.40 | 5.16 |
| Dimethylaminopropyl | $C_{14}H_{24}N_2$ | 91–94 | 2 | 76.28 | 76.54 | 10.93 | 10.85 | 12.73 | 12.33 | 244–246 | 278–280 | 5.56 | 5.45 |
| Morpholinopropyl | $C_{16}H_{26}N_2O$ | 136–138 | 2 | 73.24 | 73.10 | 9.99 | 9.71 | 10.68 | 10.93 | 243–244 | 247–248 | 5.13 | 5.26 |

TABLE II—Continued

N-DIALKYLAMINOALKYLISOINDOLINES

| R | Formula | B.P., °C. | Mn. | Analysis, percent | | | | | | HCl M.P., °C. | Dimethiodide | | |
|---|---|---|---|---|---|---|---|---|---|---|---|---|---|
| | | | | Carbon | | Hydrogen | | Nitrogen | | | M.P., °C. | Nitrogen | |
| | | | | Calcd. | Found | Calcd. | Found | Calcd. | Found | | | Calcd. | Found |
| Diethylaminoethyl | $C_{14}H_{22}N_2$ | 101–104 | 2 | 77.01 | 76.87 | 10.15 | 9.76 | 12.83 | 12.54 | 234–235 | 193–194 | 5.58 | 5.51 |
| Dimethylaminopropyl | $C_{13}H_{20}N_2$ | 120–123 | 3 | 76.42 | 76.12 | 9.87 | 9.40 | 13.71 | 13.41 | 246–247 | 237–238 | 5.74 | 5.88 |
| Morpholinopropyl | $C_{15}H_{22}N_2O$ | 164–168 | 3 | 73.13 | 72.97 | 9.00 | 8.70 | 11.37 | 11.57 | 247–248 | 230–231 | 5.28 | 5.20 |

N-DIALKYLAMINOALKYL OCTAHYDROISOINDOLES

| R | Formula | B.P., °C. | Mn. | Analysis, percent | | | | | | HCl M.P., °C. | Dimethiodide | | |
|---|---|---|---|---|---|---|---|---|---|---|---|---|---|
| | | | | Carbon | | Hydrogen | | Nitrogen | | | M.P., °C. | Nitrogen | |
| | | | | Calcd. | Found | Calcd. | Found | Calcd. | Found | | | Calcd. | Found |
| Dimethylaminoethyl | $C_{12}H_{24}N_2$ | 77–80 | 2 | 73.41 | 73.10 | 12.32 | 12.19 | 14.27 | 14.02 | 276–278 | 228–230 | 5.83 | 5.88 |
| Diethylaminoethyl | $C_{14}H_{28}N_2$ | 93–96 | 2 | 74.33 | 75.01 | 12.58 | 12.21 | 14.48 | 14.23 | 177–178 | 222–223 | 5.51 | 5.24 |
| Dimethylaminopropyl | $C_{13}H_{26}N_2$ | 85–88 | 2 | 74.22 | 74.10 | 12.46 | 12.20 | 13.32 | 13.22 | 236–237 | 246–247 | 6.08 | 5.71 |
| Diethylaminopropyl | $C_{15}H_{30}N_2$ | 105–107 | 2 | 74.56 | 74.99 | 12.68 | 12.39 | 11.75 | 11.94 | | 224–225 | 5.36 | 5.56 |
| Morpholinoethyl | $C_{14}H_{26}N_2O$ | 147–149 | 5 | 70.54 | 70.11 | 10.99 | 10.63 | 11.75 | 11.77 | 260–264 | 203–204 | [1] 7.38 | 7.40 |
| Morpholinopropyl | $C_{15}H_{28}N_2O$ | 132–135 | 2 | 71.38 | 71.24 | 11.18 | 10.93 | 11.10 | 11.37 | 253–254 | 230–231 | 5.27 | 5.38 |
| Dibutylaminopropyl | $C_{19}H_{38}N_2$ | 116–121 | 0.1 | 77.48 | 77.81 | 13.01 | 12.81 | 9.51 | 9.65 | 76–78 | | 4.84 | 5.01 |
| Dihexylaminoethyl | $C_{22}H_{44}N_2$ | 140–145 | 0.1 | 78.50 | 77.65 | 13.18 | 13.23 | 8.32 | 8.76 | 115–117 | 150–152 | 4.52 | 4.48 |
| Diethylaminohexyl | $C_{18}H_{36}N_2$ | 110–120 | 0.1 | 77.07 | 76.99 | 12.92 | 12.63 | 9.99 | 9.71 | 203–204 | 230–231 | 4.96 | 5.02 |
| Piperidinoethyl | $C_{15}H_{28}N_2$ | 103–107 | 0.1 | 76.21 | 76.29 | 11.94 | 11.69 | 11.85 | 11.70 | 300–302 | 249–250 | 5.38 | 5.32 |
| Diethylaminobutyl | $C_{16}H_{32}N_2$ | 83–87 | 0.02 | 76.12 | 76.50 | 12.78 | 12.64 | 11.10 | 10.87 | 198–199 | 201–202 | 47.33 | 46.98 |
| 3-diethylaminopropanol-2 | $C_{15}H_{30}N_2O$ | 105–115 | 0.1 | 70.81 | 71.30 | 11.89 | 11.96 | 11.01 | 11.20 | 196–198 | 155–156 | 47.15 | 46.80 |

[1] Monomethiodide.

N-DIALKYLAMINOALKYL-6-METHYL-4,7,8,9-TETRAHYDROISOINDOLINE

| R | Formula | B.P., °C. | Mn. | Analysis, percent | | | | | | HCl M.P., °C. | Dimethiodide | | |
|---|---|---|---|---|---|---|---|---|---|---|---|---|---|
| | | | | Calcd. | Found | Calcd. | Found | Calcd. | Found | | M.P., °C. | Calcd. | Found |
| Dimethylaminoethyl | $C_{13}H_{24}N_2$ | 78–85 | 0.1 | 74.94 | 74.65 | 11.61 | 11.38 | 13.45 | 13.48 | 262–263 | 203–205 | 5.69 | 5.58 |

Following the same general procedure, the trimethonium salt of isoindole has been prepared having the following formula:

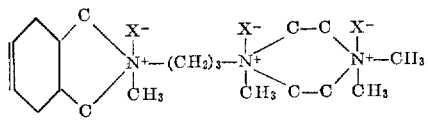

The imide was prepared from cis $\Delta^4$-tetrahydrophthalic anhydride and N-methyl piperazine propylamine and had a boiling point of 160° to 165° C. at 0.2 mm.

The hydrochloride of the above imide had a melting point of 258° to 259° C. and gave the following analytical figures:

| | Calculated | Found |
|---|---|---|
| Carbon | 52.75 | 52.84 |
| Hydrogen | 7.47 | 7.77 |
| Nitrogen | 11.53 | 11.26 |
| Chlorine | 19.47 | 19.41 |

The isoindole base obtained as described above had a boiling point of 136° to 142° C. at 0.1 mm. and gave the following analytical figures:

| | Calculated | Found |
|---|---|---|
| Carbon | 72.95 | 72.90 |
| Hydrogen | 11.10 | 10.88 |
| Nitrogen | 15.95 | 16.21 |

The trihydrochloride had a melting point of 270° to 271° C. and analyzed for 28.54% chlorine, the theoretical amount being 28.53%. The trimethonium compound obtained as above employing methyl iodide, melted at 213° to 215° C. and analyzed 54.94% iodine, the theoretical amount being 55.24%.

The compounds bis-methionium salts of the present invention have proven especially effective in the treatment of hypertension and are superior to any presently known remedies.

There are two compounds being presently used in the treatment of hypertension, known under the proprietory names of "Bistrium" and "Apresoline," and these compounds have been only recently introduced. These drugs have certain definite disadvantages. Both drugs have a rather severe, rapid action which may result in fainting on standing (postural hypotension) and the action is relatively brief, being from about 3 to 20 hours. Bistrium and Apresoline also, in certain cases, exhibit side reactions such as headache, palpitation, nausea and fainting, and Apresoline apparently has a damaging effect on the blood and bone marrow when given over a long period of time which has, in some cases, been fatal. The effect of Bistrium or Apresoline on the blood pressure is unpredictable and overdoses can reduce blood pressure to shock or coma levels. In some cases the blood pressure may even drop to zero.

The isoindoles of the present invention have a slower and more prolonged or sustained effect in lowering blood pressure and seem to have a saturation or plateau effect so that overdosage is not serious. Even if an overdose is administered, the blood pressure is not reduced to shock or coma levels. None of the side reactions of Bistrium and Apresoline have been observed with the use of isoindoles and the isoindoles seem to have a relaxing effect on nervous as well as hypertensive individuals. The effect of these isoindoles lasts 48 hours or more in observed cases.

The compound may be administered intramuscularly or orally. Doses of 10 to 30 mg. in sterile aqueous solution may be given intramuscularly every other day and 100 mg. tablets may be given once daily. Such dosages are sufficient to reduce and hold blood pressure at safe levels and no toxic or unpleasant side effects have been observed.

The present application is a continuation-in-part of my application Serial No. 336,457, filed February 11, 1953, now abandoned.

From the foregoing it will be apparent that I attained the object of my invention and have provided new and useful compounds for the treatment of hypertension.

I claim:

1. A compound selected from the group consisting of (1) N-substituted isoindoles of the formula

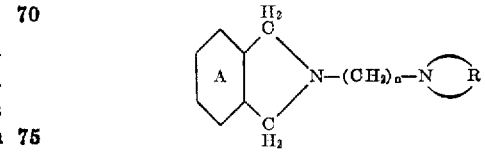

wherein ring A is selected from the group consisting of phenyl; cyclohexene; endomethylene cyclohexene; 3-methyl cyclohexene; 5-methyl cyclohexene; 3,5-dimethyl cyclohexene; cyclohexane; 3-methyl cyclohexane; 5-methyl cyclohexane; 3,5-dimethyl cyclohexane; endomethylene cyclohexane; 6-methyl cyclohexene; 6-methyl cyclohexane; 4 methyl cyclohexene; 4-methyl cyclohexane; 4,6-dimethyl cyclohexene; 4,6-dimethyl cyclohexane; wherein n is a whole number from 2 to 6; and wherein

is an amino group selected from the group consisting of morpholine, piperidine, pyrrolidine and dialkylamine of from 1 to 6 carbon atoms in the alkyl chain; and (2) the therapeutically useful dimethonium salts thereof.

2. The compound N-dimethylaminoethyl dihydroisoindoline.

3. The compound N-dimethylaminoethyl tetrahydroisoindoline.

4. The compound N-dimethylaminoethyl hexahydroisoindoline.

5. The compound N-dimethylaminoethyl endomethanoisoindoline.

6. The therapeutically useful dimethonium salts of N-dimethylaminoethyl dihydroisoindoline.

7. The therapeutically useful dimethonium salts of N-dimethylaminoethyl tetrahydroisoindoline.

8. The therapeutically useful dimethonium salts of N-dimethylaminoethyl hexahydroisoindoline.

9. The therapeutically useful dimethonium salts of N-dimethylaminoethyl endomethanoisoindoline.

References Cited in the file of this patent

UNITED STATES PATENTS

| | | |
|---|---|---|
| 2,143,751 | Adkins | Jan. 10, 1939 |
| 2,432,905 | Kharasch et al. | Dec 19, 1947 |
| 2,528,940 | Wright | Nov. 7, 1950 |
| 2,541,211 | Cusic | Feb. 13, 1951 |
| 2,807,624 | Grogan et al. | Sept. 24, 1957 |

FOREIGN PATENTS

| | | |
|---|---|---|
| 987,158 | France | Apr. 11, 1951 |

OTHER REFERENCES

Jour. Am. Chem. Soc., vol. 68, pp. 1657–58 (1946).
Comptes Rendus, vol. 222, pp. 1443–44 (1946).
Chem. Abstracts, vol. 45, pp. 5146 and 9527 (1951).
Beilstein, 4th ed., vol. XX, 2nd supp., page 172 (1953).

UNITED STATES PATENT OFFICE
CERTIFICATE OF CORRECTION

Patent No. 3,084,167 April 2, 1963

Leonard M. Rice

It is hereby certified that error appears in the above numbered patent requiring correction and that the said Letters Patent should read as corrected below.

Column 3, lines 13 and 14, for "standing. After recrystallization from alcohol the quaternary salt of the isoindoline melted at 218-220° C." read -- trate concentrated to give the isoindole which, when distilled at a pressure of 2 mm., boiled at 96-98° C. --; columns 5 and 6, Table I, under the heading "N-DIALKYLAMINOALKYL HEXAHYROPHTHALIMIDES", eight column, line 10 thereof, for "90.2" read -- 9.02 --.

Signed and sealed this 31st day of December 1963.

(SEAL)
Attest:
ERNEST W. SWIDER

Attesting Officer

EDWIN L. REYNOLDS

Acting Commissioner of Patents